United States Patent
Henksmeier et al.

(10) Patent No.: US 8,573,568 B2
(45) Date of Patent: Nov. 5, 2013

(54) LEAF SPRING ATTACHMENT

(75) Inventors: Thomas Henksmeier, Wadersloh (DE); Erik Hochapfel, Gudensberg (DE); Waldemar Bera, Borchen (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 285 days.

(21) Appl. No.: 13/039,814

(22) Filed: Mar. 3, 2011

(65) Prior Publication Data

US 2011/0221105 A1  Sep. 15, 2011

(30) Foreign Application Priority Data

Mar. 10, 2010 (DE) .......... 10 2010 010 987

(51) Int. Cl.
*B60G 11/02* (2006.01)

(52) U.S. Cl.
USPC .............. 267/52; 267/47; 267/260; 267/269; 280/124.134

(58) Field of Classification Search
USPC .......... 267/52, 43, 44, 45, 47, 36.1, 148, 149, 267/158, 260, 269; 280/124.134–124.136
See application file for complete search history.

(56) References Cited

U.S. PATENT DOCUMENTS

| | | | |
|---|---|---|---|
| 4,322,061 A | | 3/1982 | Masser |
| 4,684,110 A | * | 8/1987 | Sale et al. .......... 267/52 |
| 4,801,129 A | * | 1/1989 | Wells .............. 267/52 |
| 4,895,350 A | * | 1/1990 | Schoof et al. ......... 267/52 |
| 4,969,634 A | | 11/1990 | Bellingham |
| 2002/0190516 A1 | | 12/2002 | Henksmeier et al. |
| 2006/0244236 A1 | * | 11/2006 | Cortez et al. .......... 280/124.175 |
| 2012/0098229 A1 | * | 4/2012 | Hochapfel et al. ..... 280/124.134 |

FOREIGN PATENT DOCUMENTS

| | | |
|---|---|---|
| DE | 32 22 079 A1 | 4/1983 |
| EP | 0 229 471 A1 | 7/1987 |
| EP | 0 283 318 A1 | 9/1988 |
| EP | 1 088 687 A1 | 4/2001 |
| EP | 1 958 801 A2 | 8/2008 |
| GB | 2 100 835 A | 1/1983 |

* cited by examiner

*Primary Examiner* — Pamela Rodriguez
(74) *Attorney, Agent, or Firm* — Henry M. Feiereisen LLC

(57) ABSTRACT

A leaf spring attachment for connecting a leaf spring to an axle or frame of a motor vehicle includes a clamp to maintain the leaf spring under tension between elastomer bodies. At least one of the elastomer bodies is connected to the leaf spring by a material joint. The clamp is split to define an upper clamp member and a lower clamp member in opposition to the upper clamp member. The upper clamp member has a U-shaped configuration to embrace a topside and opposite length sides of the leaf spring. The lower clamp member includes a plurality of retention plates in spaced-apart relationship for connection with the axle by material joint. Screw fasteners are provided to secure legs of the upper clamp member to the lower clamp member.

14 Claims, 3 Drawing Sheets

LEAF SPRING ATTACHMENT

CROSS-REFERENCES TO RELATED APPLICATIONS

This application claims the priority of German Patent Application, Serial No. 10 2010 010 987.8-21, filed Mar. 10, 2010, pursuant to 35 U.S.C. 119(a)-(d), the content of which is incorporated herein by reference in its entirety as if fully set forth herein.

BACKGROUND OF THE INVENTION

The present invention relates to a leaf spring attachment to secure a leaf spring to an axle or frame of a motor vehicle.

The following discussion of related art is provided to assist the reader in understanding the advantages of the invention, and is not to be construed as an admission that this related art is prior art to this invention.

Leaf springs made of composite material such as glass fiber-reinforced plastic (GFRP) or carbon reinforced plastic (CRP), or of steel are normally installed to the rear axles of a motor vehicle by a forced engagement so as to maintain the leaf spring under tension via tensioning clips, so called spring clips, on a clamp assembly which is normally connected to the axle tube by a material joint. Conventional leaf springs are subject to great surface pressure because the screwed connections that connect the leaf spring to the axle or the frame of the vehicle become loose as the system settles and thus must be compensated. On the other hand, the surface contact should be sufficiently high to prevent a dislocation of the leaf spring. Another drawback is the relative long length of screw bolts or tensioning clamps because of their additional use to press the clamp assembly against the leaf spring.

Proposals to drill holes in the leaf spring in order to fix the position of the leaf spring relative to the clamp assembly also suffer shortcomings because this approach leads to an unwanted weakening in the cross section of the leaf spring.

It would therefore be desirable and advantageous to provide an improved leaf spring attachment which obviates prior art shortcomings and which is easy to manufacture and lightweight while still being reliable in operation.

SUMMARY OF THE INVENTION

According to one aspect of the present invention, a leaf spring attachment for connecting a leaf spring to an axle or frame of a motor vehicle includes a clamp maintaining the leaf spring under tension between elastomer bodies, with at least one of the elastomer bodies connected to the leaf spring by a material joint, the clamp being split to define an upper clamp member and a lower clamp member in opposition to the upper clamp member, the upper clamp member having a U-shaped configuration to embrace a topside and opposite length sides of the leaf spring, the lower clamp member including a plurality of retention plates in spaced-apart relationship for connection with the axle by material joint, and screw fasteners to secure legs of the upper clamp member to the lower clamp member.

The presence of a material joint between the at least one elastomer body and the leaf spring results in a significant reduction of surface pressure because the risk of dislocation of the leaf spring relative to the contacting elastomer body is prevented even when the surface pressure is low. As the surface pressure can be kept to a minimum, the clamp can be made overall less massive and thus lightweight and cost-efficient. There is also no need to change the cross section of the leaf spring in order to fix the position of the leaf spring in relation to the clamp. The elastic pretension of the elastomer body can also be used to substantially compensate encountered settling losses in the system so that the screwed connections to connect the leaf spring to the axle or the frame of the vehicle can no longer loosen.

According to another advantageous feature of the present invention, the leaf spring may be made of a fiber composite.

According to another advantageous feature of the present invention, the elastomer bodies may be made of rubber or cellular material. The coefficient of friction in the separation gaps of the leaf spring attachment can be influenced and adjusted through appropriate material selection of the elastomer bodies.

The material joint between the retention plates of the lower clamp member and the axle can be realized in a cost-efficient manner and eliminates the need for multiple attachments so that the force pattern is overall more beneficial. Thus, there is no need to bolt the lower clamp to an axle and the screw fasteners of the invention can be sized relatively short.

According to another advantageous feature of the present invention, the at least one elastomer body can be connected to the leaf spring by a cold-setting or hot-setting adhesive. The adhesive may hereby be applied onto the leaf spring and/or the elastomer body.

According to another advantageous feature of the present invention, the at least one elastomer body may be connected to the leaf spring by a resin content of the leaf spring of fiber composite. For example, an elastomer body may be connected in a mold of the RTM process (RTM=Resin Transfer Molding) directly during the molding process of the leaf spring of fiber-reinforced composite with the leaf spring via resin injected into the mold.

Regardless of the type of joining technique, it is possible to configure the elastomer body itself as composite material. It is even conceivable to integrate at least one metal inlay in the elastomer body. The presence of a metal inlay and the selection of a Shore hardness of a elastomeric base material renders it possible to influence the resultant pretension force profile in order to adjust the targeted surface pressure in the desired manner.

Although it would be conceivable to bond the at least one elastomer body on its leaf spring distal side with the axle or frame of the vehicle and leaf spring clamp, respectively, this makes it more difficult to replace during repair. Therefore, it is currently preferred to provide a form-fitting engagement of the leaf spring distal side of the at least one elastomer body with the clamp. In this way, one side of the elastomer body has a connection by material joint and the other side of the elastomer body has a connection by form-fitting engagement which ensures that the leaf spring is fixed in place in relation to the clamp, on one hand, and permits easy assembly and disassembly, on the other hand.

According to another advantageous feature of the present invention, an inlay may be disposed in a region for integration in the at least one elastomer body, with the inlay disposed in a region which is in form-fitting engagement with the clamp. The inlay may be made of metal. The inlay may be connected with an elastomer body of rubber through vulcanization and may be placed in a groove of the clamp so that the elastomer body can assume only one position in relation to the groove. The presence of a inlay, especially of metal, provides improved positioning of the elastomer body in relation to the groove compared to an elastomer body without inlay in view of the softer material of the elastomer body.

According to another advantageous feature of the present invention, the retention plates define a gap which can be configured to be suitable for a form-fitting engagement with the at least one elastomer body. To prevent the elastomer body from rubbing against the gap and thus to prevent damage, the retention plates can have angled flanges so that the gap receives a wedge-shaped configuration. The wedge shape results in a reliable centering, on one hand, and by providing a radiused transition zone to the angled flanges contact surfaces to the elastomer body are created which are gentle to the material and do not cut.

According to another advantageous feature of the present invention, the retention plates may have a generally U-shaped configuration defining flanges which face away from the leaf spring and are directed towards the axle and connected to the axle by material joint. The flanges can thus be made of varying lengths. Also, there is no need for the flanges to extend in parallel relationship. An essential feature is only a support of both flanges of the lower retention plate directly upon the axle so as to realize a direct force introduction over a short path. There is no need for further screwed connections so that the overall arrangement becomes lightweight and compact.

According to another advantageous feature of the present invention, the upper clamp member may have an H-shaped configuration defined by two spaced-apart parallel legs which span a width of the leaf spring, and by a bridge which interconnects the parallel legs and is dimensioned to extend in length direction of the leaf spring. The H-shaped configuration provides a defined spacing between the parallel legs relative to one another. At the same time, the screw connection in the region of the parallel legs for attachment with the lower clamp member substantially results in a tension force which is applied on the elastomer body and thus on the leaf spring via the parallel legs. The space between the parallel legs and the bridge is contracted indirectly via the parallel legs against the elastomer body and thus towards the leaf spring. Therefore, the parallel legs should thus be made as solidly as possible to apply the necessary surface pressure whereas the bridge may be configured lightweight. Advantageously, the bridge can be configured of U-shaped cross section and open towards the leaf spring.

As the parallel legs are attached at their ends, there is no uniform force profile across the length of the parallel legs. Therefore, the parallel legs can be configured to have a thickness which decreases from midsection of the leaf spring to their ends. Suitably, an arched-shaped profile of the parallel legs is provided to optimize stress pattern and weight.

According to another advantageous feature of the present invention, a centering pin can be connected to the inlay via the at least one elastomer body, with the centering pin being dimensioned to project beyond the at least one elastomer body. The centering pin provides an installation aid for implementing a correct disposition of the leaf spring upon the clamp. The centering pin is also designated as a center bolt. The centering pin may be connected, e.g., by material joint with a metal inlay in the lower elastomer body. The inlay with the centering pin may hereby be incorporated by vulcanization. The centering pin end which faces away from the leaf spring may engage in a centering opening of the lower clamp member. Neighboring retention plates can hereby be bridged in the area of the gap, with the bridge provided with a respective centering opening. It is also conceivable to configure the area of the gap as an indentation between the retention plates. In this case, the retention plates form a unitary structure.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
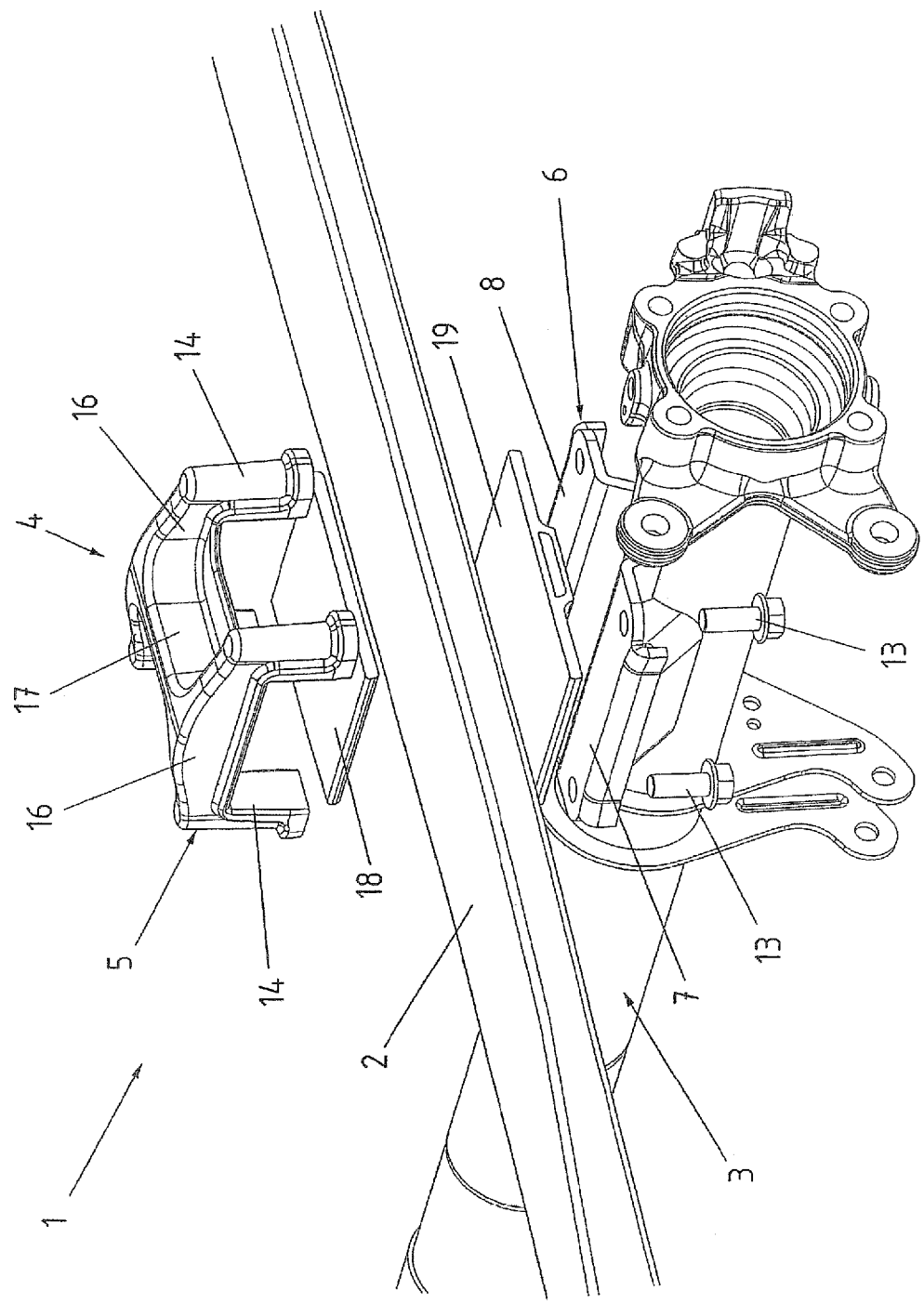
FIG. 1 is an exploded view of a leaf spring attachment according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
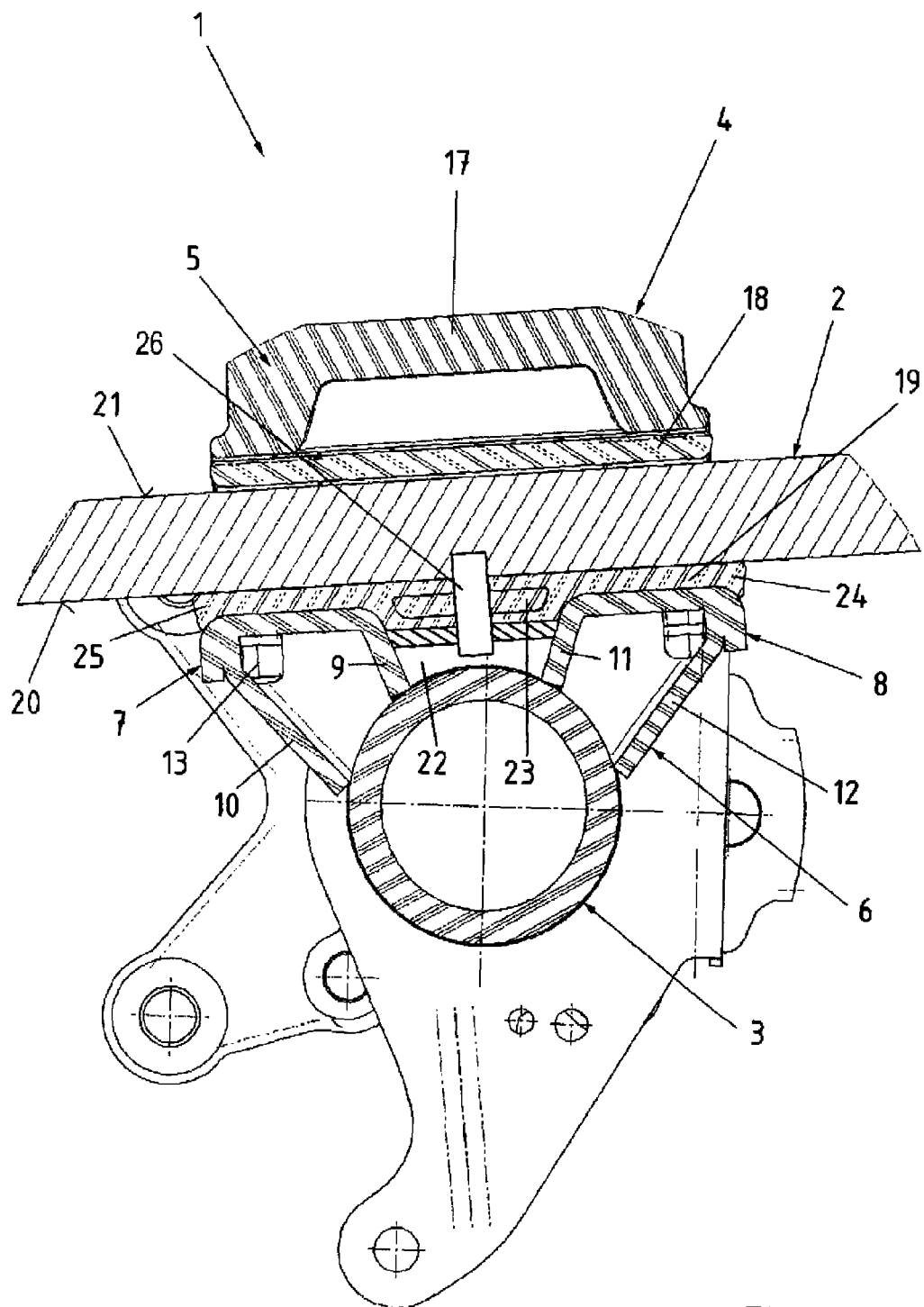
FIG. 2 is a longitudinal section of the leaf spring attachment of FIG. 1.

Turning now to the drawing, and in particular to FIG. 1, there is shown an exploded view of a leaf spring attachment according to the present invention, generally designated by reference numeral 1, for fixing a leaf spring 2 to a tubular axle 3 of a (not shown) chassis of a motor vehicle. In the example shown here, the leaf spring 2 is made of a glass fiber reinforced plastic and has a rectangular cross section. The leaf spring attachment 1 includes a leaf spring clamp, generally designated by reference numeral 4 and having an upper clamp member 5 and a lower clamp member 6. The upper clamp member 5 can be releasably connected to the lower clamp member 6. The lower clamp member 6 is welded with the axle 3. The lower clamp member 6 includes two retention plates 7, 8 which are arranged in spaced-apart relationship and have angled flanges 9, 10, 11, 12, respectively, which extend in a straight line in a direction of the axle 3 and via which the retention plates 7, 8 are welded to the axle 3 (FIG. 2).

As is shown in FIG. 1, the retention plates 7, 8 have end zones formed with two bores, respectively, for passage of screw bolts 13 for threadably connecting the upper clamp member 5 with the lower clamp member 6.

Figure 3:
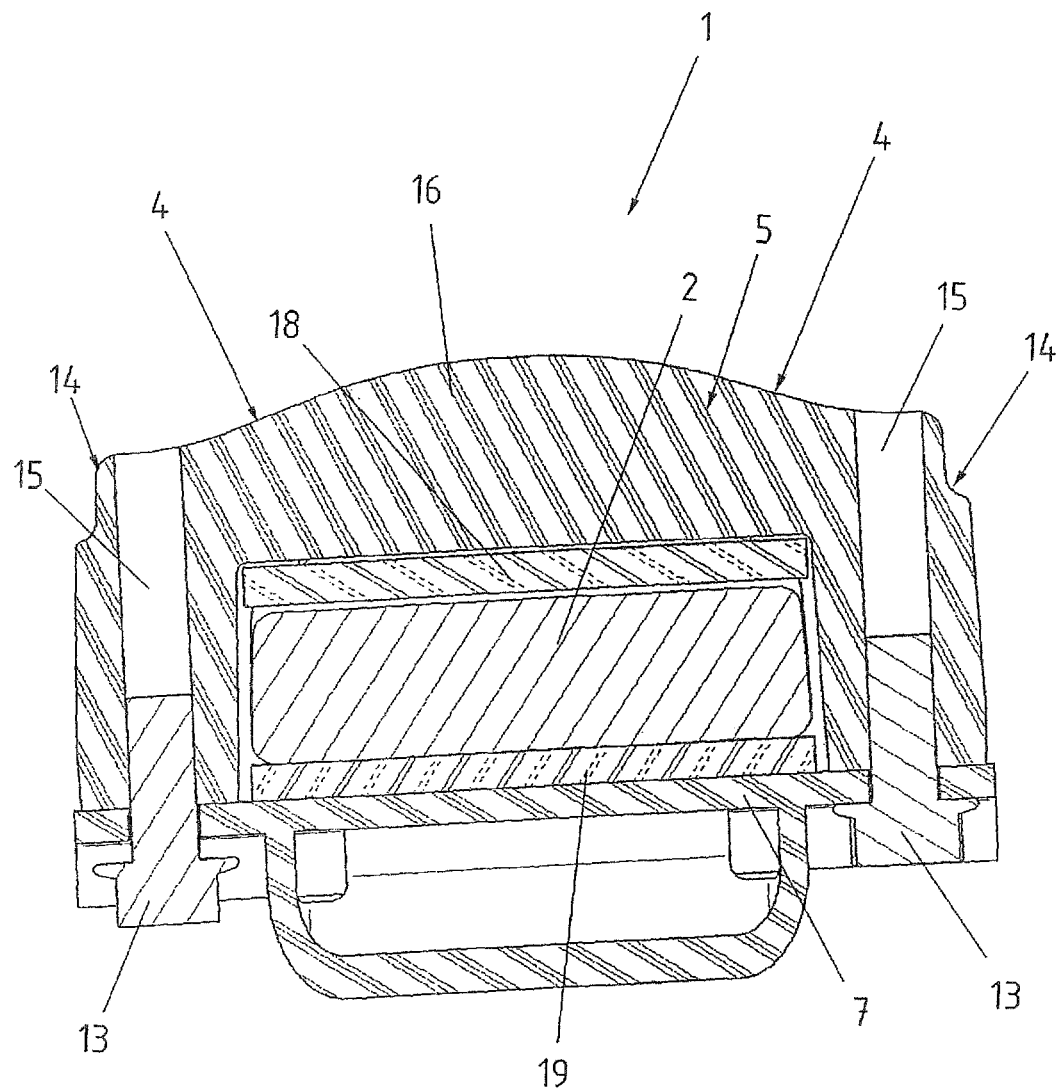
FIG. 3 is a cross section of the leaf spring attachment of FIG. 1.

The threaded connection is realized on the legs 14 which extend to the side of the leaf spring 2. The upper clamp member 5 includes four identically configured legs 14 respectively arranged in the corners and provided with a threaded bore 15 (FIG. 3). The threaded bore 15 is configured as through bore. Two legs 14 are screwed to the retention plate 7 via a parallel leg 16 and two legs 14 are screwed to the retention plate 8 also via a parallel leg 16. Both parallel legs 16 extend transversely to the leaf spring 2, with a central bridge 17 extending in length direction of the lead spring 2 and interconnecting the parallel legs 16. As a result, the upper clamp member 5 has a substantially H-shaped configuration.

As can be seen from FIGS. 1 and 3, the topside of the upper clamp member 5 is curved in an arched manner. The thickness of the parallel legs 16 is thus at a maximum in the middle or center longitudinal plane of the leaf spring 2 and decreases towards the ends in the direction of the legs 14 in an arched manner. The decrease in thickness is continuous or steady. There are no sudden transitions.

The bridge 17 is positioned at a location where the thickness of the parallel legs 16 is at a maximum, i.e. precisely in midsection. The bridge 17 has a same thickness or height as the parallel legs 16. FIG. 2 shows that the bridge 17 has a U-shaped cross section and is configured open towards the leaf spring 2 to save weight because the main tension forces are transmitted via the parallel legs 16.

When installed, a flat block-shaped elastomer body 18 is disposed between the upper clamp member 5 and the leaf spring 2. As can be seen from FIG. 2, the elastomer body 18 extends along the length of the upper clamp member 5, as measured in longitudinal direction of the leaf spring 2.

A further elastomer body 19 is disposed on the opposite bottom side 20 of the leaf spring 2. The elastomer body 19 rests flatly upon the bottom side 20, whereas the elastomer body 18 rests flatly upon the topside 21 of the leaf spring 2. Unlike the elastomer body 18, the elastomer body 19 is connected to the bottom side 20 of the leaf spring 2 by a material joint, e.g. bonded, in a manner not shown in greater detail.

In addition, the lower elastomer body 19 is in form-fitting engagement with the lower clamp member 6. As the retention plates 7, 8 of the lower clamp member 6 extend in spaced-apart relationship, a gap 22 is established between the retention plates 7, 8 and bounded by the slanted flanges 9, 11. Part of the elastomer body 19 engages this virtually wedge-shaped and thus centering gap 22. In addition, an inlay 23 is received in the lower elastomer body 19. The inlay 23 is slightly narrower than the mouth region of the gap 22. The inlay 23 is especially vulcanized into the elastomer body 19, e.g. rubber, and fully enveloped by the elastomeric material. The flat inlay 23 has slanted ends at an angle which conforms substantially to the profile of the flanges 9, 11. The inlay 23 may be made of metal or any suitable resistant plastic, like, e.g., polyamide. A centering pin 26 is connected to the inlay 23 via the elastomer body 19.

A further form-fitting engagement is provided in the end zone of the elastomer body 19. The elastomer body 19 is also thickened in this area so that the ends 24, 25 of the elastomer body 19 slightly embrace the outer longitudinal edges of the retention plates 7, 8.

The retention plates 7, 8 are provided in the transition zone to their flanges 9, 10, 11, 12 with sufficiently great radii to avoid sharp edges in the contact zone to the elastomer body 19.

While the lower clamp member 6 is configured as welded construction, the upper clamp member 5 can be configured as machined cast part. The upper clamp member may also be configured as forged part or as welded sheet metal construction.

The elastomer body 18 may also, or as an alternative to the elastomer body 19, be connected by material joint, e.g. bonded, with the topside 21 of the leaf spring 2.

Of course, the afore-described configuration is shown by way of example only, and other configurations which generally follow the concepts outlined here are considered to be covered by this disclosure. For example, while the provision of an upper clamp member with legs and a lower clamp member without legs is currently a preferred embodiment, it is, of course, also conceivable to provide the legs on the lower clamp member. In this case, the preceding description with reference to the upper clamp member is equally applicable for the lower clamp member which may be configured as cast part, forged part, or welded construction.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A leaf spring attachment for connecting a leaf spring to an axle or frame of a motor vehicle, comprising:
    a clamp maintaining the leaf spring under tension between elastomer bodies, with at least one of the elastomer bodies connected to the leaf spring by a material joint, said clamp being split to define an upper clamp member and a lower clamp member in opposition to the upper clamp member, said upper clamp member having a U-shaped configuration to embrace a topside and opposite length sides of the leaf spring, said lower clamp member including a plurality of retention plates in spaced-apart relationship for connection with the axle by material joint; and
    screw fasteners to secure legs of the upper clamp member to the lower clamp member, wherein the retention plates have angled flanges, said angled flanges defining a wedge-shaped gap configured for a form-fitting engagement with the at least one elastomer body.

2. The leaf spring attachment of claim 1, wherein the leaf spring is made of a fiber composite.

3. The leaf spring attachment of claim 2, wherein the elastomer bodies are made of rubber.

4. The leaf spring attachment of claim 2, wherein the fiber composite has a resin content, said at least one elastomer body being connected to the leaf spring by the resin content of the fiber composite.

5. The leaf spring attachment of claim 1, wherein the at least one elastomer body is connected to the leaf spring by a cold-setting or hot-setting adhesive.

6. The leaf spring attachment of claim 1, further comprising an inlay for integration in the at least one elastomer body.

7. The leaf spring attachment of claim 6, wherein the inlay is made of metal.

8. The leaf spring attachment of claim 6, wherein the inlay is disposed in a region of the at least one elastomer body which region is in form-fitting engagement with the clamp.

9. The leaf spring attachment of claim 6, further comprising a centering pin connected to the inlay via the at least one elastomer body, said centering pin being dimensioned to project beyond the at least one elastomer body.

10. The leaf spring attachment of claim 1, wherein the at least one elastomer body has a leaf spring distal side which has a surface structure in form-fitting engagement with the clamp.

11. The leaf spring attachment of claim 1, wherein the retention plates have a generally U-shaped configuration and include flanges facing away from the leaf spring and directed towards the axle, said flanges being connected to the axle by material joint.

12. The leaf spring attachment of claim 1, wherein the upper clamp member has an H-shaped configuration defined by two parallel legs which span a width of the leaf spring, and by a bridge which interconnects the parallel legs and is dimensioned to extend in length direction of the leaf spring.

13. The leaf spring attachment of claim 12, wherein the parallel legs have a thickness which decreases from midsection of the leaf spring to their ends.

14. The leaf spring attachment of claim 12, wherein the bridge has a U-shaped cross section and is open towards the leaf spring.

* * * * *